Dec. 11, 1951     F. E. BALLEW     2,578,497
ROAD MARKER
Filed May 20, 1946     4 Sheets-Sheet 1
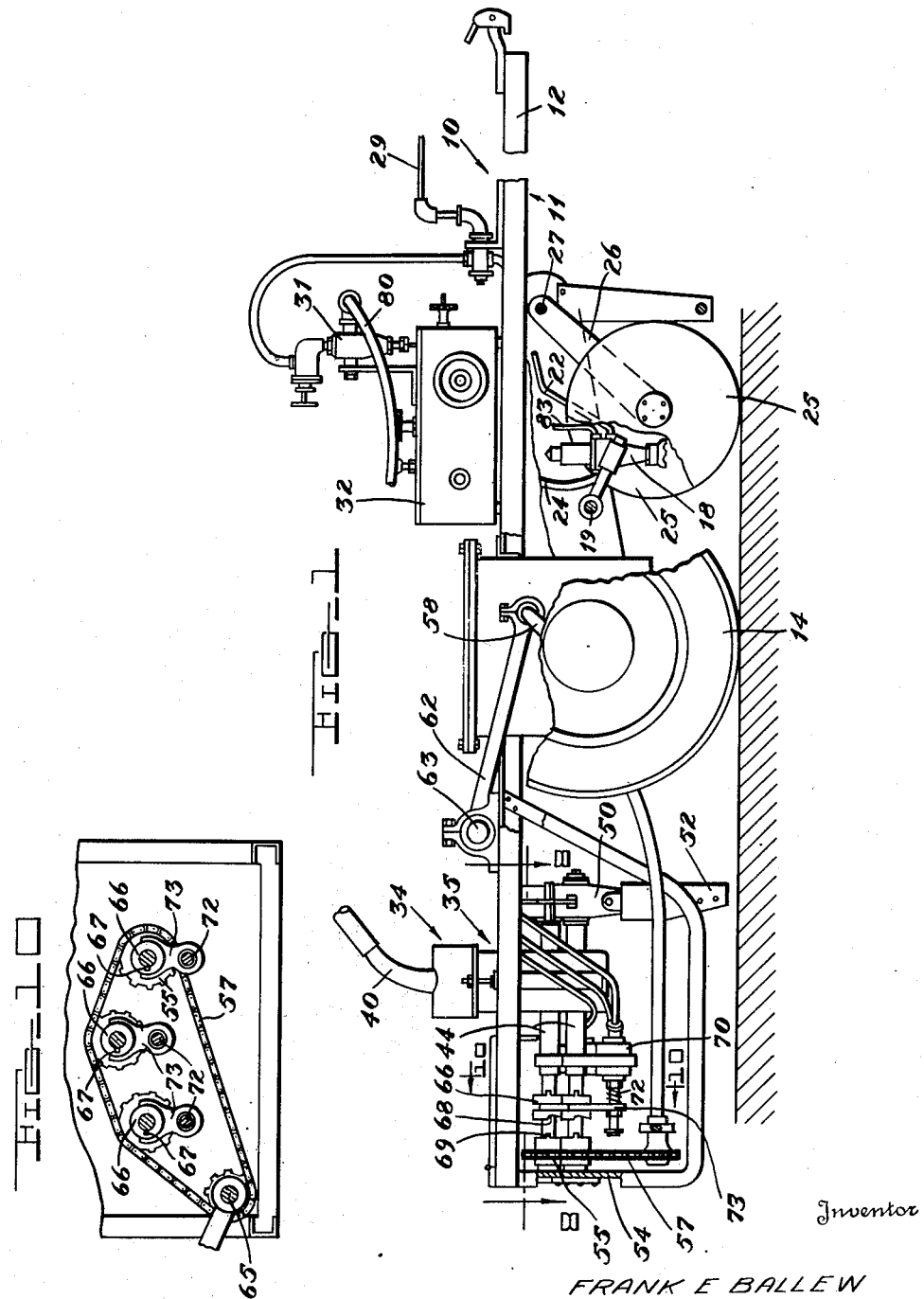
Inventor
FRANK E BALLEW
By Whitmore Hulbert & Belknap
Attorneys Dec. 11, 1951    F. E. BALLEW    2,578,497
ROAD MARKER
Filed May 20, 1946    4 Sheets-Sheet 2
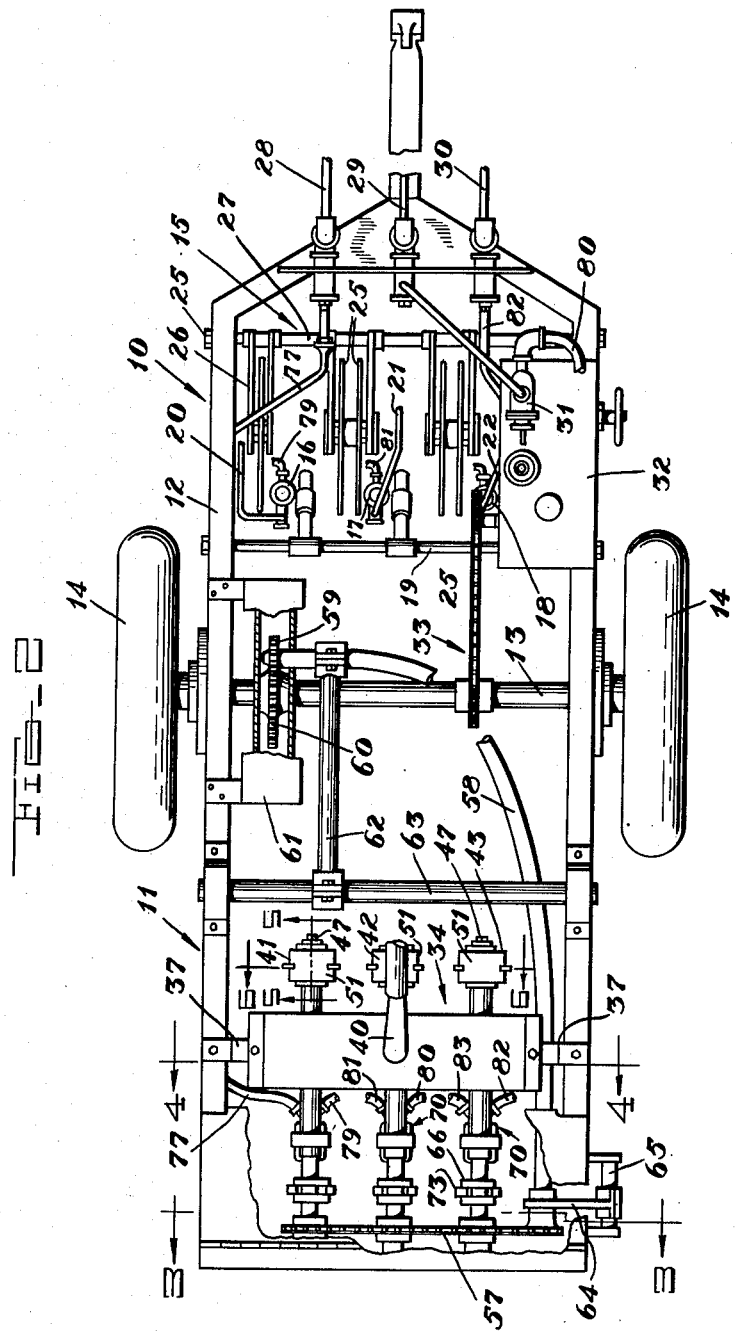
FIG_2
Inventor
FRANK E. BALLEW Dec. 11, 1951   F. E. BALLEW   2,578,497
ROAD MARKER
Filed May 20, 1946   4 Sheets-Sheet 3
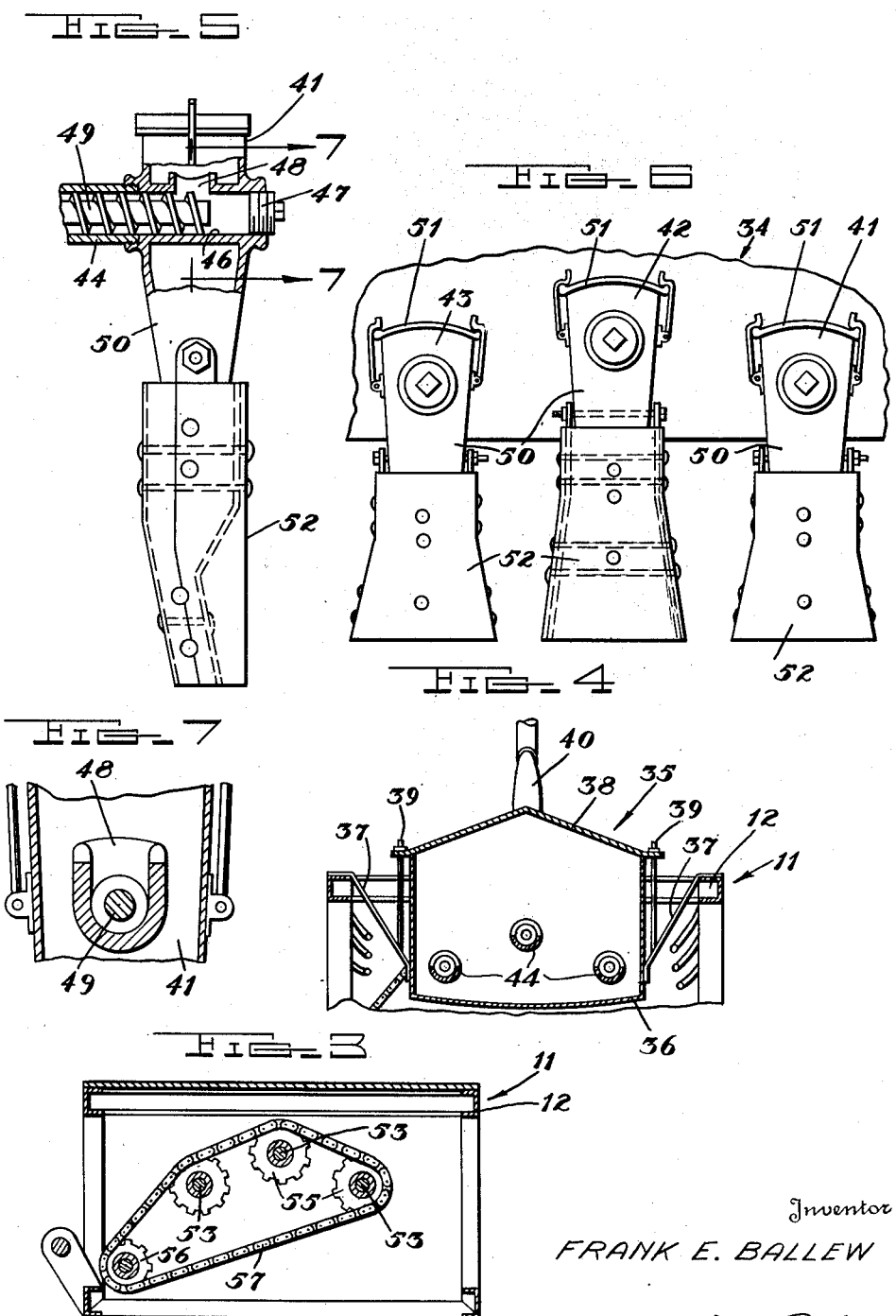
Inventor
FRANK E. BALLEW Dec. 11, 1951  F. E. BALLEW  2,578,497
ROAD MARKER
Filed May 20, 1946  4 Sheets-Sheet 4
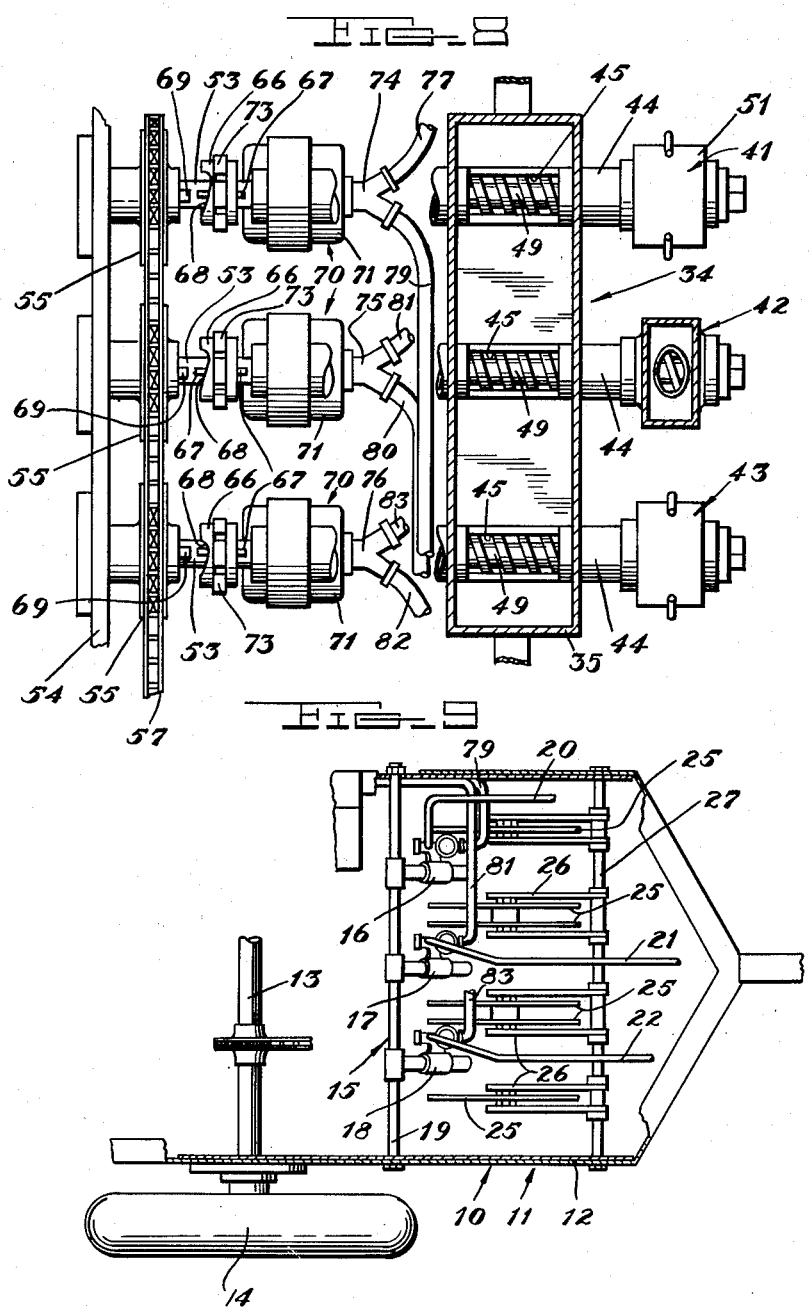
Inventor
FRANK E. BALLEW Patented Dec. 11, 1951

2,578,497

UNITED STATES PATENT OFFICE 2,578,497

ROAD MARKER

Frank E. Ballew, Woodland, Mich.

Application May 20, 1946, Serial No. 671,039

4 Claims. (Cl. 275—2)

This invention relates to road or surface marking equipment and refers more particularly to apparatus for applying the required markings on the road surface while the apparatus is being propelled or pulled over the road surface.

For the purpose of promoting safety on highways, it has been proposed to not only paint the surface of highways, with center and lane margin lines, but to also apply material on the lines having light-reflecting characteristics. Thus, the markings are not only clearly visible during the day, but are also visible at night when they are most needed, because the light from the head lights of vehicles is reflected back to the drivers of the vehicles from the markings. The light-reflecting material employed may vary, but particularly satisfactory results have been obtained by using granular light-reflecting material such, for example, as glass, plastic, quartz or bright metal particles. In any case, the granular material selected is usually applied before the paint is dry so that the paint will act as a binder for securing the particles to the road surface.

In the interest of economy, it is desirable to apply the light-reflecting material on the freshly painted lines in one operation, and while the distributing apparatus is drawn or propelled over the road surface. This economical requirement introduces serious problems among which are properly timing the application of the light-reflecting material in relation to the operation of the paint applying means and metering the quantity of light-reflecting material distributed in relation to the rate of travel of the apparatus over the road surface, so that the proper amount of light-reflecting material is applied to the previously painted line or lines. Also, in some instances, it is essential to apply a broken line on the road surface and this presents the additional problem of starting and stopping the flow of light-reflecting material at the proper intervals.

The principal object of this invention is to overcome the above problems by providing apparatus having means for accurately timing the application of the light-reflecting material in relation to the paint applying means and also having means for metering the quantity of light-reflecting material distributed in relation to the rate of movement of the apparatus over the road surface.

Another object of this invention is to provide apparatus having means enabling the distribution of light-reflecting material on broken paint lines when required.

The foregoing as well as other objects will be made more apparent as this description proceeds, especially when considered in connection with the accompanying drawings, wherein:

Figure 1 is a side elevational view of road surface marking equipment having certain parts broken away for the sake of clearness;

Figure 2 is a plan view partly in section of the construction shown in Figure 1;

Figures 3, 4, 5 and 6 are sectional views taken respectively on the lines 3—3, 4—4, 5—5 and 6—6 of Figure 2;

Figure 7 is a sectional view taken on the line 7—7 of Figure 5;

Figure 8 is a sectional view taken on the line 8—8 of Figure 1;

Figure 9 is a fragmentary plan view of a part of the equipment shown in Figure 2; and Figure 10 is a cross sectional view taken substantially on the plane indicated by the line 10—10 of Figure 1.

The road surface marking equipment selected for the purpose of illustrating this invention is designed to apply three closely spaced lines of paint or binder on a surface of a road or highway and to distribute light reflecting particles, such for example, as paint, pumice, glass, plastic or quartz on the lines while the paint or binder is in a "tacky" stage, so that the light-reflecting material is anchored in place when the paint or binder eventually dries. It will further be noted from the following description that the equipment is designed to enable periodically interrupting the centerline at regular intervals, so that this line may be readily distinguished from the outside lines.

With the above in view, reference is now made more in detail to the drawings, wherein it will be noted that the reference character 10 indicates a carriage adapted to be connected at the front end to a tractor or other suitable type of pulling vehicle capable of drawing the carriage over the surface of the road to be marked. In detail the carriage 10 comprises a frame 11 having longitudinally extending side sills 12 secured together in laterally spaced relationship and supported on an axle 13. The axle 13 extends transversely of the frame 11 intermediate the ends of the latter and supports ground engaging wheels 14 at opposite ends thereof. At least one of the ground engaging wheels is secured to the axle 13, so that the latter rotates as a unit with this ground engaging wheel.

Supported on the frame 11 in advance of the axle 13 is suitable paint spraying equipment 15. The paint spraying equipment 15 forms no part of the present invention and need not be described in detail herein. It will suffice to point out that the equipment comprises three spray guns 16, 17 and 18. The spray guns are supported on a transverse shaft 19 in spaced relation to each other longitudinally of the shaft and the opposite ends of the shaft are respectively secured to the side sills 12 of the frame. As shown particularly in Figure 1 of the drawings, the spray guns are supported in a substantially vertical position with the nozzles directed toward the road surface to be marked.

The supply of paint is usually carried by the pulling vehicle not shown herein and is admitted to the respective guns through conduits 20, 21 and 22. The paint admitted to the guns is atomized and discharged onto the road surface by air under pressure supplied from a suitable source and conveyed to the respective guns through conduits 24. If desired, the paint discharged from the guns may be confined by shields 25 in the form of discs rotatably supported on the free ends of arms 26 having the opposite ends pivotally mounted on a transverse shaft 27. As shown particularly in Figure 9 of the drawing, the number and spacing of the shields 25 is such that one shield occupies a position on each side of each gun.

The spray guns 16, 17 and 18 are respectively operated by air under pressure supplied through the conduits 28, 29 and 30. The air under pressure flowing through the center conduit 29 is controlled by a valve 31 and this valve is automatically operated by a regulating device 32 secured to the frame 11 of the carriage 10. As shown particularly in Figure 2 of the drawings, the metering device is driven from the live axle 13 by a sprocket and chain assembly 33. The specific construction of the regulating device 32 forms no part of the present invention, and is shown and described in detail in my copending application Serial No. 663,848, filed April 22, 1946, now Patent No. 2,516,173, issued July 25, 1950. It will suffice to point out heerin that the device 32 is responsive to rotation of the ground engaging wheels 14 over the road surface to periodically operate the valve 31 and the center spray gun 17. The arrangement is such that the center spray gun 17 is started and stopped at regular intervals by the regulating device 32 to apply a broken line on the road surface.

The device for distributing the light-reflecting material on the lines applied by the spray guns previously described is indicated in the several figures of the drawings by the reference character 34. The device 34 comprises a hopper 35 having a container 36 open at the top and supported between the side sills 12 of the frame 11 on brackets 37. The upper end of the container 36 is adapted to be closed by a cover 38 normally secured in its closed position to the brackets 37 by fastener elements 39. The particles of the light-reflecting material employed are introduced into the hopper 35 through the cover 38 by a supply tube 40.

The hopper 35 communicates with three distributing chambers 41, 42 and 43 spaced from each other transversely of the frame so as to respectively assume positions directly above the lines previously applied by the paint spraying guns. Each of the three distributing chambers are connected to the hopper 35 by means of tubes 44 having the rear end portions projecting through the front and rear walls of the hopper in the manner clearly shown in Figure 8 of the drawings.

The portions of the tubes 44 located in the hopper 35 are formed with slots 45 at the upper portions thereof to enable the particles of the light-reflecting material to enter the tubes. The front ends of the tubes 44 respectively register with tubes 46 formed integral with the distributing chambers in the manner clearly shown in Figure 5 of the drawings. The front ends of the tubes 46 are closed by threaded plugs 47 and delivery openings 48 are formed in the top portions of the tubes to enable the particles of light-reflecting material to pass upwardly out of the tubes 46 and into the respective distributing chambers 41.

The particles of light-reflecting material entering the tubes 44 from the hopper 35 are conveyed to the distributing chambers by screw type conveyors 49. The screws 49 are respectively rotatably supported in the tubes 44 and the front end portions of the screws project into the tubes 46. The arrangement is such that rotation of the screws feeds the particles of light-reflecting material from the hopper 35 to the tubes 46 and causes the particles admitted to the tubes 46 to pass upwardly into the distributing chambers through the openings 48.

The particles of light-reflecting material discharged from the openings 48 drop downwardly by the action of gravity into the delivery end portions 50 of the distributing chambers 41, 42 and 43. These particles are prevented from escaping out of the upper ends of the distributing chambers by removable caps 51 detachably clamped to the open upper ends of the distributing chambers. The delivery end portions 50 of the distributing chambers are tapered to concentrate the particles of light-reflecting material, and the lower ends of the distributing portions 50 are open to enable the particles to escape into the chutes 52. The chutes 52 are pivotally supported at opposite sides of the delivery portions 50 in register with the discharge ends of the latter, and the lower ends of the chutes 52 extend in close proximity to the road surface. The lower ends of the chutes are, of course, open to enable depositing the particles of reflecting material on the lines previously painted by the spray guns.

The screws 49 are driven from the live axle 13 of the carriage and the rear ends of the screws are formed integral with shafts 53. The rear ends of the shafts 53 on the other hand are journalled in suitable bearings carried by a frame member 54 secured to the frame 11 at the rear end of the latter. As shown particularly in Figures 3 and 8 of the drawings, a sprocket 55 is rotatably supported on each of the shafts 53, and these sprockets are connected to a driving sprocket 56 by a chain 57. The driving sprocket 56 is secured to the rear end of a flexible drive shaft 58 having a pinion 59 secured to the front end thereof. The pinion 59 meshes with a gear 60 secured to the live axle 13 for rotation as a unit with the latter. The pinion 59 and gear 60 are shown in Figure 2 of the drawings as supported within a housing 61, which is secured to the adjacent side sill 12 of the frame 11. It will also be noted from Figure 2 of the drawings that the front end of the flexible drive shaft is carried by a stabilizing arm 62 having the rear end clamped to a cross shaft 63 mounted on the frame 11. The rear end of the flexible drive shaft is also secured to a stabilizing arm 64 having the outer end clamped on a rod 65 carried by the adjacent side sill 12 of the frame 11. The arrangement is such that the arm 64 not only serves as a support for the rear end of the flexible drive shaft 58, but also may be adjusted to tighten the driving chain 57.

The sprockets 55 on the respective shafts 53 are adapted to be secured to the shafts by clutches 66. Referring again to Figure 8 of the drawings, it will be noted that a clutch 66 is slidably mounted on each shaft 53 and is secured against rotation by a key 67. Each clutch 66 is also formed with a shoulder 68 adapted to engage a cooperating projection 69 on the hub of the adjacent sprocket 55 to connect the sprocket to its associated screw shaft 53.

The clutches are moved into operative relation with the respective sprockets 55 by fluid motors 70 having cylinders 71 and having plungers 72. The plungers 72 are connected to shifting forks 73, which in turn, are respectively connected to the clutches 66. The rear ends of the cylinders 71 are respectively connected to Y-shaped fittings 74, 75 and 76. One branch of the fitting 74 is connected to a conduit 77 which extends forwardly along the frame 11 and is connected to the air supply conduit 28. The other branch of the fitting 74 is connected to a conduit 79 which extends to the spray gun 16 for operating the latter. One branch of the fitting 75 is connected to a conduit 80 which extends forwardly along the frame 11 and is connected to the supply conduit 29 through the valve 31. The other branch of the fitting 75 is connected to a conduit 81 which in turn communicates with the gun 17 for operating the latter. One branch of the third fitting 76 is connected to a conduit 82, which extends forwardly along the frame 11 and communicates with the air supply conduit 30. The other branch of the fitting 76 is connected to a conduit 83 which communicates with the spray gun 18 for operating the latter.

It follows from the foregoing that when the supply conduits 28, 29 and 30 are opened to permit the passage of air under pressure, this air flows directly to the fluid motors 70. As a result the plungers 72 are moved rearwardly to connect the clutches 66 with the sprockets 55. Thus the screw conveyors 49 are rotated to feed particles of light-reflecting material to the distributing chambers 41, 42 and 43 before air is admitted to the spray guns. The time delay between operation of the screw type conveyors 49, and the operation of the spray guns is determined to insure a supply of the particles of light reflecting material in the distributing chambers by the time the chutes 52 assume positions above the respective painted lines. It has been stated above that the conduit 80 extending from the center fluid motor 70 is connected to the air supply line 29 through the valve 31. Thus, the operation of the center fluid motor 70, as well as the operation of the center spray gun 17 is automatically controlled by the regulating device 32. As a result the center spray gun 17 and the corresponding distrbuting means for the light-reflecting material are operated periodically at regular intervals to apply a broken line on the road surface. In any case, since the three screw type conveyors 49 are operated from the live axle 13, it follows that the distribution of the light-reflecting particles is automatically metered or varied in response to changes in the speed of rotation of the axle. This feature is of substantial importance because it assures applying uniform lines on the road surface notwithstanding the rate of travel of the carriage over this surface.

What I claim as my invention is:

1. Road marking equipment comprising a carriage having a frame and having a ground engaging wheel, a hopper supported on the frame for containing particles of a light-reflecting material, a plurality of distributing chambers for light-reflecting particles having discharge openings directed downwardly and supported on the frame in positions to apply a corresponding number of laterally spaced rows of light-reflecting particles on the road surface, a plurality of screw type conveyors corresponding in number to the number of distributing chambers for feeding the particles of light-reflecting material from the hopper and positively ejecting the same into the distributing chamber, driving means for the screw type conveyors, a clutch for operatively connecting each screw type conveyor to the driving means, and means for independently operating the clutches to connect the screw type conveyors to said driving means.

2. Road marking equipment comprising a carriage having a frame and having a ground engaging wheel, a hopper supported on the frame for containing particles of light-reflecting material to be applied to the road surface, a distributing chamber for light-reflecting particles having a discharge opening at the bottom directed toward the road surface, a screw type conveyor for feeding material from the hopper and positively ejecting the same into the distributing chambers, driving means for the screw type conveyor connected to the ground engaging wheel, a clutch for connecting the screw type conveyor to the driving means, and fluid pressure operated means for operating the clutch to connect the screw type conveyor to the driving means, and valve means for controlling the flow of fluid under pressure to the clutch operating means.

3. Road marking equipment comprising a carriage having a frame and having a ground engaging wheel, a hopper supported on the frame for containing a material to be applied to the road surface, a plurality of tubes extending into the hopper adjacent the bottom of the latter and having openings in the upper portions thereof for receiving said material, a distributing chamber communicating with each tube and having a discharge opening at the bottom directed toward the road surface, a screw type conveyor rotatably supported in each tube for feeding material from the hopper and positively ejecting the same into the distributing chambers, driving means for the screw conveyors connected to the ground engaging wheel, clutches for respectively connecting the screw conveyors to the driving means, and means for independently operating the clutches.

4. Road marking equipment comprising a carriage movable over a road surface and having a frame, a hopper supported on the frame and adapted to hold a supply of material to be applied to the road surface, a distributing chamber supported on the frame in spaced relation to the hopper and having a discharge opening at the bottom directed toward the road surface, a tubular passage extending between the hopper and distributing chamber, one end of the passage projecting into the hopper adjacent the bottom of the latter and having an inlet opening at the top to receive material deposited in the hopper, the other end of the passage projecting into the distributing chamber through an opening in one side of the chamber adjacent the top of the latter and being closed, the top wall of the passage in said distributing chamber having an outlet opening through which material passes upwardly into the chamber and at least one side of the passage being spaced from the adjacent side of the chamber to enable the material entering the chamber through said outlet opening to drop by gravity through the chamber, a screw rotatably supported within the passage for feeding material from the hopper to the distributing chamber, and means for rotating said screw.

FRANK E. BALLEW.

REFERENCES CITED

The following references are of record in the file of this patent:

UNITED STATES PATENTS

| Number | Name | Date |
|---|---|---|
| 1,230,069 | Gilroy | June 12, 1917 |
| 1,811,324 | Lockard | June 23, 1931 |
| 1,824,419 | Abbe | Sept. 22, 1931 |
| 1,996,700 | Fulmer | Apr. 2, 1935 |
| 2,125,472 | Taylor | Aug. 2, 1938 |
| 2,278,948 | Rodli et al. | Apr. 7, 1942 |
| 2,323,262 | Warren | June 29, 1943 |
| 2,357,930 | Clark | Sept. 12, 1944 |